United States Patent [19]
Bollerup

[11] 3,834,531
[45] Sept. 10, 1974

[54] MEMORY DEVICE
[75] Inventor: Johannes Bollerup, El Monte, Calif.
[73] Assignee: Anja Engineering Corporation, Monrovia, Calif.
[22] Filed: Apr. 27, 1973
[21] Appl. No.: 355,165

[52] U.S. Cl............................ 209/74 M, 200/33 B
[51] Int. Cl............................... B07c, H01h 43/00
[58] Field of Search........... 209/74 R, 74 M, 75, 90; 74/3.52; 200/33 B; 307/139; 214/11 C

[56] References Cited
UNITED STATES PATENTS
2,962,655  11/1960  Wiley et al................... 209/74 R X
3,394,584  7/1968  Nayer............................. 209/74 R Primary Examiner—Allen N. Knowles
Attorney, Agent, or Firm—Fulwider, Patton, Rieber, Lee & Utecht

[57] ABSTRACT

A memory device and a method for selectively controlling the processing of articles in an automated machine performing a sequence of processing steps on the articles as they are moved through successive work stations on the machine. A wheel carries a number of uniformly spaced pins around its circumference, and is indexed in unison with the processing machine, each article being associated with a corresponding pin for the sequence of processing steps. A pin is moved to a new position with respect to the wheel on detection of an abnormality in the corresponding article; and is subsequently detected as being in this new position by appropriately disposed microswitches coupled to mechanisms to control subsequent processing steps on the abnormal article.

21 Claims, 7 Drawing Figures

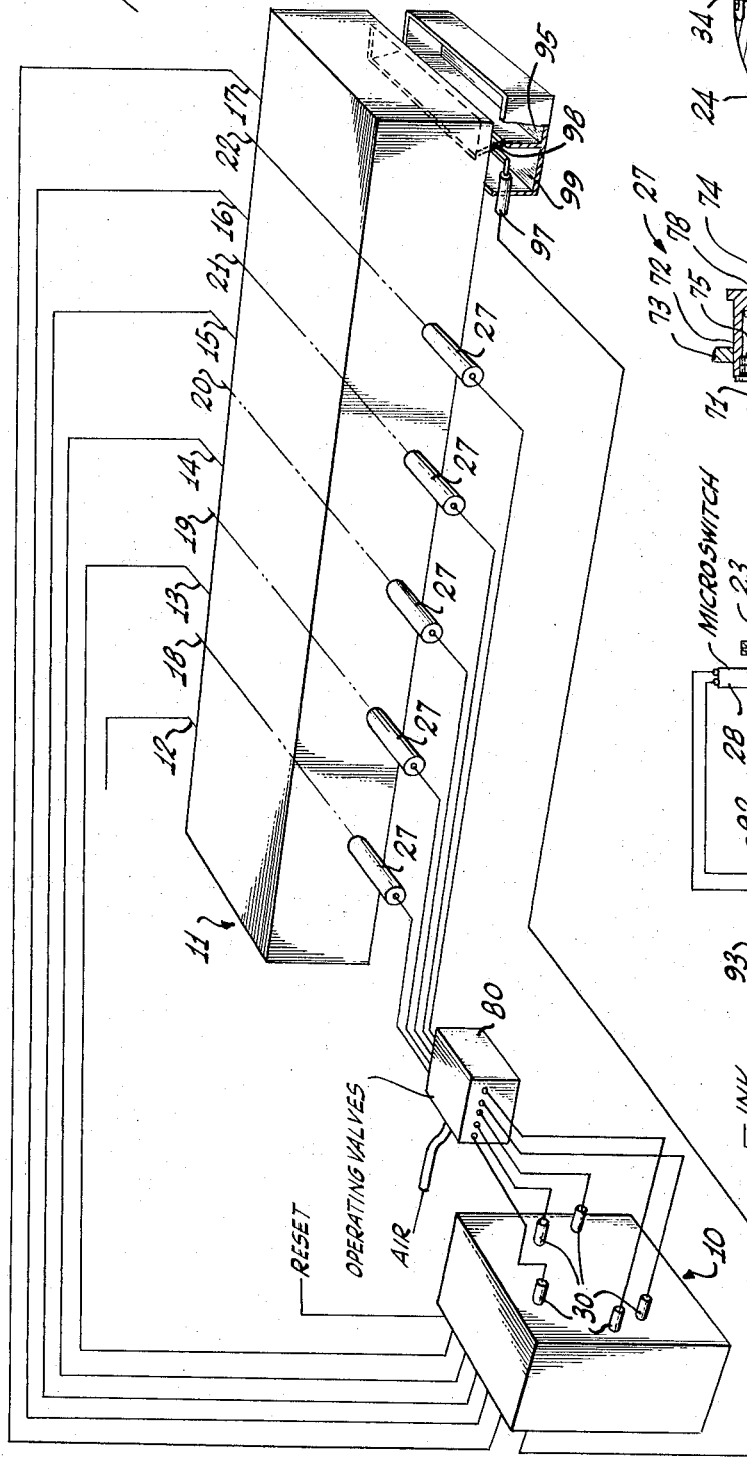
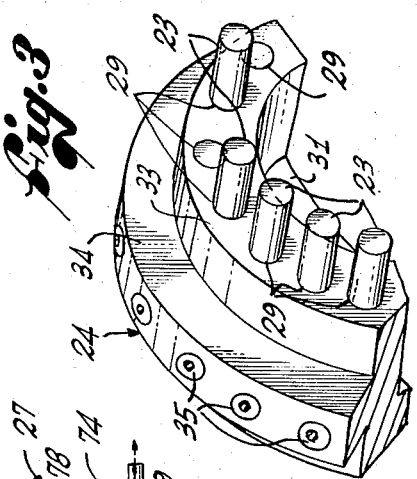
Fig. 1
Fig. 2
Fig. 3

MEMORY DEVICE

BACKGROUND OF THE INVENTION

This invention relates to devices used for controlling the processing of articles in an automated machine which performs a sequence of processing steps on the articles as they are moved through successive stations on the machine. In particular, it relates to memory devices in which discrete memory elements are each associated with an article being processed, and in which information concerning the articles is stored during the processing sequence, to be later retrieved and used to control subsequent processing steps.

In the prior art, the use of memory devices of this kind has required the intervention of an operator to store the desired information in the memory elements on the basis of an inspection of the article as they pass an inspection station in the machine, and the subsequent control of processing steps has been generally limited to activating otherwise inactive processing mechanisms or to signaling the operator to take some further action. When the processing steps proceed at a rapid rate, memory devices requiring operator intervention are not always completely successful in achieving the desired control over subsequent processing steps.

SUMMARY OF THE INVENTION

The present invention resides in an improved memory device used for controlling the processing of articles in an automated machine which performs a sequence of processing steps on the articles as they are moved through successive stations on the machine. The memory device includes a plurality of discrete memory elements held at equally spaced positions around an endless conveyor which is indexed one position at a time in unison with the movement of the articles through the successive stations. The memory elements each have at least two recognizable memory conditions, a normal condition and an active condition, and the device includes a plurality of actuators positioned to change memory elements to the active condition in response to signals from automatic inspection probes at preselected stations, and also includes a plurality of detection devices, sensitive to memory elements in the active condition and coupled to corresponding mechanisms to control subsequent processing steps without operator intervention.

In the preferred embodiment of the invention the endless conveyor is a wheel, the memory elements are pins movably held in equally spaced holes close to the circumference of the wheel, and different positions of the pins with respect to the wheel correspond to different memory conditions. The actuators are disposed around the wheel at angular positions corresponding to the preselected stations at which the automatic inspection probes are located, and the detection devices are disposed at angular positions corresponding to the work stations at which the subsequent processing steps are to be controlled as a result of the signals from the inspection probes. Thus the device effects control of subsequent processing steps as a result of automatic inspection of the articles at several stations, all without operator intervention.

Another important feature of the preferred embodiment is that the detection devices are coupled to controlling mechanisms having a variety of functions, including disabling or overriding normally operative mechanisms to prevent damage or unnecessary processing of defective articles, sorting defective articles from acceptable articles, and counting acceptable articles.

Other aspects and advantages of the invention will become apparent from the following detailed description, taken in conjunction with the accompanying drawings.

BRIEF DESCRIPTION OF THE DRAWINGS

FIG. 1 is a perspective, diagrammatical view showing the interconnection of the memory devices to the stations of a processing machine.

FIG. 2 is a schematic view showing the interconnection of the wheel of the memory device with a typical mechanical inspection probe and a typical mechanism to override a processing step, and includes fragmentary, sectional views, not drawn to scale, of the wheel, the inspection probe and the overriding mechanism.

FIG. 3 is a fragmentary, perspective view of the wheel of the memory device.

DETAILED DESCRIPTION

Figure 4:
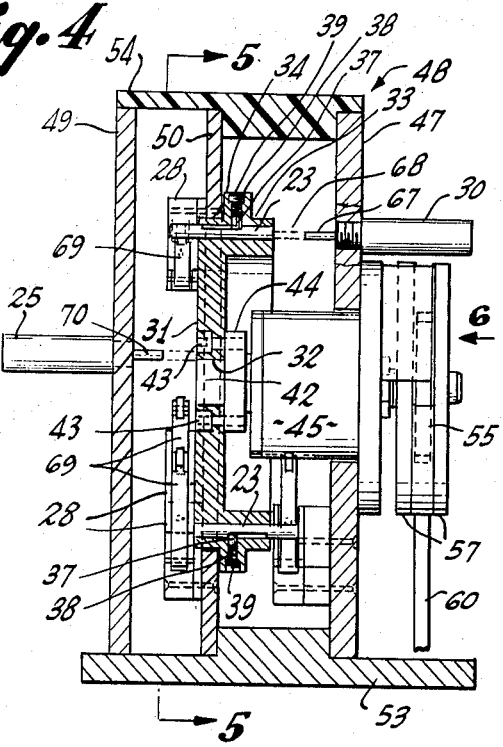
FIG. 4 is a side elevational view of the wheel of the memory device mounted in its housing.

As shown in the drawings for purposes of illustration, the invention is embodied in a memory device, indicated generally by the reference number 10 in FIG. 1, for use with an automated machine 11 that performs a sequence of processing steps on articles moved through successive stations 12–22 on the machine; for example, a machine for assembling felt-tip pens. At the work stations 12–17, six successive processing steps are performed, and at the stations 18–22, automatic inspection is made to check prior corresponding processing steps, as will be hereinafter described in detail. The memory device generally comprises a plurality of discrete memory elements 23 (FIGS. 3–5) held in equally spaced positions around an endless conveyor 24 which is indexed one position at a time in unison with the movement of the articles through the successive stations 12–22. Thus, each memory element is moved successively through a sequence of positions corresponding to the sequence of processing steps, and each article being processed is associated with a corresponding memory element throughout the entire sequence of processing steps on the article, after which that particular memory unit is associated with a new article entering the processing sequence.

Each of the memory elements 23 can be set in one of two recognizable memory conditions, to be referred to in this description as a normal condition and an active condition. Since each memory element is associated with an article being processed, the memory conditions of the elements can be used to store important information about the corresponding articles, such as whether a part has been omitted from the process of assembly of the felt-tip pens. Such information is then retrievable and is determinative of subsequent processing steps to be performed on the articles. An actuator 25 (FIGS. 4 and 5) for resetting the memory elements 23 to the normal condition is positioned with respect to the conveyor 24 to insure that each memory element is in the normal condition as it becomes associated with a new article.

As is shown in the drawings of the preferred embodiment, the invention is particularly well suited for controlling the processing steps associated with assembling such articles as felt-tip pens, where it is important to discontinue the assembly process if an essential part of a pen is missing. For example, if an ink reservoir were to be omitted, damage would result if the machine subsequently pumped ink into the pen. A disadvantage of prior systems used to control this type of processing is that some degree of operator intervention is usually required, and, for processes that proceed rapidly, such systems are not always completely successful in preventing damage or unnecessary processing of defective articles.

In accordance with the method of the present invention, the memory elements 23 are selectively moved from their normal condition to their active memory condition in response to the detection of defective articles by automatic inspection probes 27 (FIGS. 1-2) at a number of preselected inspection stations 18-22, and then those memory elements in the active condition actuate detection devices 28 (FIG. 5) located at memory element positions corresponding to subsequent processing steps, the detection devices being coupled with mechanisms to achieve the desired results at the corresponding work stations 13-17 (FIG. 1) without operator intervention.

More specifically, in the presently preferred form of the invention the conveyor is a wheel 24 and the memory elements are pins 23 carried in a plurality of holes 29 uniformly spaced around the wheel. The pins 23 are movable with respect to the wheel 24 from a normal position to an active position. A plurality of actuators 30 are disposed around the wheel 24 at angular positions corresponding to the preselected inspection stations 18-22 at which the automatic inspection probes 27 are located, and the detection devices 28 are also disposed around the wheel and positioned to detect pins in the active position as the pins pass through angular positions corresponding to subsequent work stations. The actuator 25 for resetting memory elements to the normal condition is located at an angular position immediately following the position corresponding to the last of the sequence of processing steps, (see FIGS. 4 and 5) and is operable to push each pin back to the normal position before the pin becomes associated with a new article entering the machine.

The wheel 24 of the preferred embodiment, illustrated in FIGS. 3-7, is made from solid metal and comprises a disk-shaped portion 31 with a central hole 32, and a circumferential rim portion 33 of substantial thickness formed integral with the disk-shaped portion, the rim having a peripheral flange 34 around its outside surface. The holes 29 to carry the pins 23 are formed in the rim portion 33, parallel to the wheel axis and are uniformly spaced around the rim portion so that there are at least as many holes as there are work stations on the processing machine 11.

Figure 7:
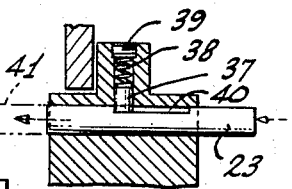
FIG. 7 is an enlarged, sectional view of a pin in position in the wheel, taken substantially along line 7—7 of FIG. 5.
Figure 6:
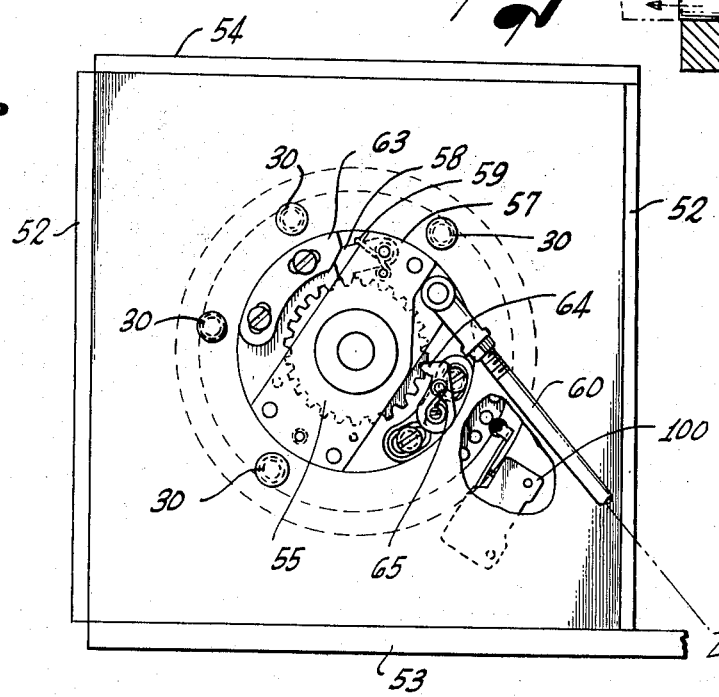
FIG. 6 is an elevational view taken in the direction of the arrow 6 in FIG. 4 and particularly showing the wheel indexing mechanism.

Each of the pins 23 is a solid metal cylinder, sized for a sliding fit in one of the holes 29, and is substantially longer than the holes. The flange 34 on the rim portion 33 of the wheel has a number of radial holes 35 therein, each positioned to intersect with one of the pin holes 29. A small cylindrical plug 37 made of brass or some material softer than the pin material is secured in each radial hole 35 by a compression spring 38 and a setscrew 39 (FIG. 7) and bears on a central flat surface 40 of each pin, retaining the pin in the hole but permitting sliding movement to the extent of the length of the flat surface of the pin. Each pin 23 is therefore movable between the normal condition or position and the active condition or position shown in dotted lines at 41 (FIG. 7).

The wheel 24 is mounted on the end portion of a shaft 42 and secured thereto by a plurality of bolts 43 which attack the disk portion 31 of the wheel to a flange 44 (FIG. 4) rigidly attached to the shaft. The shaft 42 is supported by a single bearing 45 on an end wall 47 of a generally box-shaped wheel housing 48, thereby rotatably supporting the wheel within the housing. In addition to the afore-mentioned first end wall, the housing 48 includes a second end wall 49 and a central wall or partition 50 parallel to the end walls and having circular opening 51 through which part of the rim portion 34 of the wheel protrudes. The housing 48 also includes side walls 52, a base plate 53 and a top plate 54 which may be transparent to allow observation of the device in operation. The wheel 24 is totally enclosed by the housing 48 only to prevent the intrusion of dust and other matter.

Figure 5:
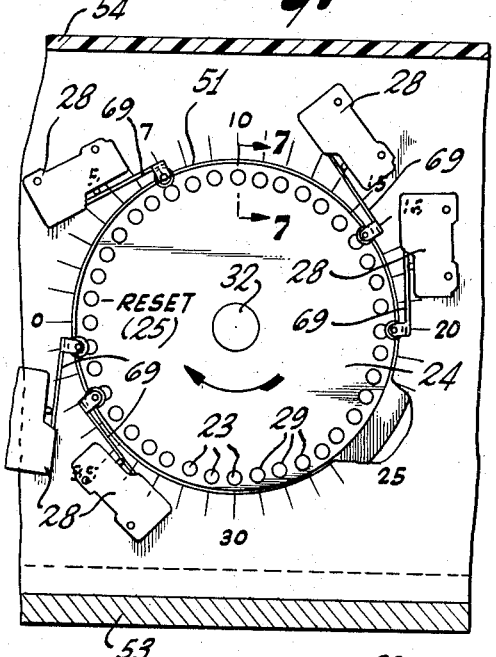
FIG. 5 is a sectional view taken substantially along the line 5—5 of FIG. 4.

The wheel 24 is indexed one pin position at a time, in unison with the movement of the articles through the successive stations of the machine 11, by means of a conventional ratchet mechanism outside the housing 48 and adjacent to the first end wall 47. As seen in FIGS. 4 and 5, a toothed ratchet wheel 55 is rigidly mounted on the same shaft 42 as the wheel 24, and a pair of flat indexing plates 57 are rotatably mounted on the shaft, one on each side of the ratchet wheel. The plates 57 each have two rounded ends and two parallel sides substantially longer than the diameter of the ratchet wheel 55, and are secured to each other at the ends to rotate as a pair on the shaft.

A pawl 58 is pivotally mounted between the indexing plates 57 and is urged by a pawl spring 59 into engagement with the teeth of the ratchet wheel 55. A rod 60 is also pivotally mounted at one end between the indexing plates 57 and is positioned substantially tangentially to the ratchet wheel 55. The rod 60 is made to reciprocate in unison with the movement of articles through successive stations by means of a cam 61 mounted on a rotating cam shaft 62 and bearing on the opposite end of the rod 60. As the rod 60 moves outwardly from the cam shaft 62, the pawl 58 drives the ratchet wheel 55, and with it the pin wheel 24, until the pawl strikes a pawl stop 63 rigidly attached to the first end wall 47. During this movement, a second pawl 64, pivotally mounted on the first end wall 47 and urged into engagement with the ratchet wheel 55 by a second pawl spring 65, rides over the teeth of the ratchet wheel as it turns. As the reciprocating rod 60 makes a return movement, the second pawl 64 engages with the ratchet teeth to prevent return movement of the wheel 24, while the first pawl 58 rides over the teeth as the mechanism completes a cycle of operation.

The actuators 30 (FIGS. 2 and 4) are air-operated cylinders in the preferred embodiment and are mounted in holes in the first end wall 47 at angular positions corresponding to the inspection probes 27 on the processing machine 11. Each of the cylinders 30 has a piston rod 67 which protrudes through the first end wall and which moves to an extended position (shown in dotted lines at 68 in FIG. 4) when high pressure air is supplied to the cylinder in response to a signal from the corresponding inspection probe 27. In moving to its extended position, the piston rod 67 contacts one of the pins 23 corresponding to the inspected article, and moves it to the active position, i.e., protruding from the other side of the wheel 24.

The detection devices 28 are microswitches mounted on the central wall 50 of the wheel housing 48 at angular positions corresponding to work stations at which subsequent processing steps are to be controlled as a result of the detection of an abnormality at one of the inspection stations 18–22. The microswitches 28 are positioned so that an actuator arm 69 on each is momentarily disturbed from a normal position by any pin 23 that has been moved to the active position by one of the air cylinders 30 located on the other side of the wheel 24. Movement of the actuator arm 69 of any of the microswitches 28 closes a pair of electrical contacts (not shown) and completes an electric circuit which is coupled to an appropriate mechanism for controlling the corresponding processing step.

The actuator 25 for resetting the pins to their normal position is also an air-operated cylinder, similar to the cylinders 30 for setting the pins 23 to the active position. After each indexing movement of the wheel 24, the cylinder 25 is momentarily operated by means of appropriate coupling devices (not shown), such as a solenoid-operated air valve actuated by a microswitch in the processing machine. The reset cylinder 25 has a protruding piston rod 70 which extends on operation of the cylinder and pushes each pin 23 which is in the active position back to its normal position after it has gone full cycle.

As mentioned above, the preferred embodiment illustrated and described has been usefully employed with a processing machine for assembling felt-tip pens. That particular assembly process will be briefly described to illustrate, by way of example only, the connection and use of the memory device with a typical processing machine.

The processing steps for assembling a pen include: supplying a pen barrel at a work station, inserting an ink reservoir in the barrel, filling the reservoir with ink, inserting a back plug, inserting a nib, and adding a cap. These processing steps can be considered to take place at the work stations 12–17, respectively, in FIG. 1. After each of the first five of these steps, inspection is made at the inspection stations 18–22 respectively. Since the sixth step, adding a cap, is one that can easily be performed manually if necessary, capless, but otherwise perfect pens need not be rejected with defective pens, and, accordingly, no inspection is made after the sixth step.

A typical inspection probe 27 is shown in FIG. 2 as comprising a feeler rod 71 screwed to one end of a flanged probe guide 72 which is slidingly fitted in a bearing 73. A plunger 74 is slidingly fitted in the probe guide 72, and a compression spring 75 between the plunger and the feeler rod 71 urges the plunger outwardly from the probe guide. In operation, an actuating means (not shown) reciprocates the plunger 74 back and forth in unison with the processing machine. If the feeler rod 71 contacts a part 76 being inspected, there is no further movement of the feeler rod and probe guide 72, and the spring 75 is compressed by the advancing plunger 74. If the part 76 is absent, the spring 75 is not compressed, and the moving plunger 74 carries the probe guide 72 with it, to actuate a microswitch 77 and signal the abnormal condition. The probe guide 72 is returned to a normal initial position by means of a flange 78 on the plunger 74 which contacts an internal shoulder 79 on the probe guide. Other types of inspection probes may be needed for various inspection operations. For example, an electrical probe would be used to test for the presence of ink in the pen assembly process.

The electrical signals from the inspection probes 27 are used to operate corresponding air valves, usually grouped together on the processing machine on a panel or in a box 80. FIG. 2 illustrates schematically how one of these solenoid operated valves 81 is connected to the corresponding air cylinder 30 to set one of the pins 23 to the active position when a defective processing step is detected at the corresponding inspection station. Setting the pin 23 in the active position in effect labels the corresponding article as defective, which in turn selectively disables all subsequent processing steps on that article.

If, for example, one of the inspection probes 27 failed to detect an ink reservoir in the pen barrel, the next processing step, pumping ink into the barrel, would be disabled, as would all the subsequent steps. A mechanism for disabling the ink pumping step is shown in FIG. 2 by way of example. Normally, ink is pumped through an outlet tube 82 by the movement of a plunger rod 83 in a pump chamber 84. A cam wheel 85 rotates once for each pumping operation, camming against one end of a lever 87 pivoted near its center, and thereby moving a pump slide element 88 mounted to slide freely in a block 89 and mechanically linked to the other end of the lever 87.

A pump overriding lever 90 is pivotally mounted on the pump slide 88. Normally, the overriding lever 90 is held by a spring (not shown) in such an angular position that one of its ends 91 contacts the plunger rod 83 and forms a rigid mechanical linkage between the moving pump slide 88 and the plunger rod 83, thus pumping the ink. When the corresponding microswitch 28 detects a pin in the active position, a solenoid operated air valve 92 is actuated and air is supplied to operate an air cylinder 93. The cylinder has a piston rod 94 which extends in operation to strike the opposite end 96 of the overriding lever 90 and pivot the lever to such a position that its end 91 which normally contacts the plunger rod 83 is lifted clear of the rod to prevent the pumping action. After this momentary overriding action, the overriding lever 90 falls back to its normal position.

In the preferred embodiment the memory device is also used to control a sorting operation and to count acceptable processed articles. The sorting step occurs at the very end of the sequence of processing steps, as the completed articles are received by a bin 95. When a defective article reaches this step, the corresponding pin 23 in the active position triggers the operation of an air cylinder 97 in the same manner as was discussed above in connection with the disabling of subsequent processing steps. In this instance, however, the controlling mechanism actuated by the air cylinder 97 does not disable a step but moves a pivoted deflecting flap 98 to divert the defective article into a separate reject bin 99.

The number of acceptable articles processed is counted by a separate microswitch 100 (FIG. 6) mounted on the first end wall 47 to detect pins 23 in the normal position immediately before the reset air cylinder 25 operates to reset all pins to the normal position. Clearly, each pin 23 surviving one complete revolution of the wheel 24 without being set to the active position represents an acceptable article, and the microswitch 100 is coupled to an electromechanical counter (not shown) to accumulate the number of acceptable articles produced.

From the foregoing, it will be seen that the memory device in the form shown herein for purposes of illustration can be usefully employed to control the automatic processing of articles in a machine for performing a sequence of processing steps on the article. The device and the method for its use with such a machine, satisfy a long felt need in the art to avoid unnecessary and damaging processing of defective articles without operator intervention. It will also be seen that, while a particular embodiment of the invention has been illustrated and described in detail, various modifications can be made without departing from the spirit of the invention.

I claim:

1. A memory device for controlling the processing of articles in an automated processing machine performing a sequence of processing steps on said articles at successive stations on said machine, comprising:

a wheel of substantial thickness at its circumference rotatably mounted on a horizontal axis in a supporting structure and having a plurality of holes therethrough parallel to said axis and uniformly spaced around a circle concentric with said axis, there being at least as many of said holes as there are processing steps;

a plurality of pins mounted in said parallel holes for axial movement therein from a normal position in which the pin protrudes from a first side of said wheel to an active position in which the pin protrudes from the opposite side of said wheel;

indexing means mechanically linked to said processing machine, for advancing said wheel in unison with the performance of said processing steps, whereby each of said pins is successively moved through a sequence of positions corresponding to said sequence of processing steps;

inspection probe means for detecting certain abnormalities in said articles at preselected ones of said stations;

a plurality of solenoid-operated fluid valves, each responsive to signals from one of said inspection probe means;

a plurality of cylinders each having a piston rod and a piston actuated by fluid supplied through one of said valves, said cylinders being located in relation to said first side of said wheel at angular positions corresponding to said preselected stations, and said piston rods being generally aligned with corresponding pins at said angular positions to move said pins to their active position in response to said signals from corresponding inspection probe means;

a plurality microswitches for detecting those of said pins in said active position, arranged in relation to said opposite side of said wheel at angular positions corresponding to processing steps subsequent to at least one of said preselected stations;

control means for said subsequent processing steps, coupled to corresponding ones of said microswitches to selectively control processing on those of said articles with said certain abnormalities; and a resetting cylinder having a fluid actuated piston positioned to reset each of said pins to said normal position on completion of the movement of each of said pins through said sequence of positions.

2. The device defined in claim 1, wherein said indexing means comprises:

a toothed ratchet wheel mounted on said wheel axis for rotation with said pin wheel;

an indexing plate mounted on said axis for rotation independently of said pin wheel and said ratchet wheel;

a reciprocating rod pivotally connected to said indexing plate to impart an angular oscillatory motion thereto, said rod being mechanically linked to said processing machine;

a first pawl element mounted on said indexing plate to engage said ratchet wheel as the plate moves in a forward direction, thereby driving said pin wheel in said forward direction; and a second pawl element mounted on said supporting structure to engage said ratchet wheel as said indexing plate moves in a reverse direction, thereby preventing movement of said pin wheel in said reverse direction.

3. The device defined in claim 1, further including:

an additional microswitch for detecting those of said pins in said normal position, and positioned with respect to said wheel immediately prior to said pin resetting cylinder; and counting means coupled to said additional microswitch, to accumulate a count of those of said pins completing a revolution of said wheel in said normal position, whereby said count includes only those of said articles not subject to said certain abnormalities.

4. The device defined in claim 1, wherein said control means include:

a second group of solenoid-operated air valves connected to corresponding microswitches; and mechanical means actuated by air supplied from said second group of valves to selectively control processing on those of said articles with said certain abnormalities.

5. The device defined in claim 4, wherein said mechanical means include a pivotally mounted flap movable to sort those of said articles with said certain abnormalities from others of said articles leaving said processing machine.

6. The device defined in claim 1, wherein:

said wheel has a plurality of radial holes extending from said circumference to intersect with corresponding ones of said holes parallel with said axis;

said pins each have a flat surface over a central portion; and said device further includes a plurality of plugs fitted and secured in said radial holes to bear against said flat surfaces to permit only limited axial movement of said pins between said normal and active positions.

7. A memory device for controlling the processing of articles in an automated processing machine for performing a sequence of steps on said articles at successive stations on said machine, comprising:

a wheel rotatably mounted in a supporting structure;

a plurality of pins carried by said wheel at spaced positions around the circumference of the wheel and secured to the wheel to be movable between a normal position and an active position, there being at least as many of said pins as there are stations on said machine;

indexing means connected with said processing machine, for advancing said wheel in unison with the performance of said steps, whereby each of said pins is successively moved through a sequence of positions corresponding to said sequence of processing steps, said indexing means including ratchet means for advancing said wheel and linkage means for connecting said ratchet means for operation thereof in unison with the movement of said articles between said successive stations;

means for moving said pins to said active position as said pins reach angular positions corresponding to preselected ones of said stations, said pin moving means being responsive to certain abnormalities in said articles detected at said corresponding preselected stations;

detection means responsive to those of said pins in said active position, disposed at preselected angular positions corresponding to processing steps subsequent to at least one of said preselected stations, and coupled to control said corresponding subsequent processing steps; and means for resetting said pins back to said normal position as each of said pins completes its movement through said sequence of positions.

8. The device defined in claim 7, wherein:

said pin moving means and said pin resetting means comprise fluid-actuated cylinders each having a piston and a piston rod, said piston rod extending in operation to move a corresponding one of said pins; and said detection means comprise a plurality of microswitches mounted on said supporting structure.

9. The device defined in claim 7, further including:

second detection means responsive to those of said pins in said normal position and positioned with respect to said wheel immediately prior to said pin resetting means; and counting means coupled to said second detection means, to accumulate a count of those of said pins completing a revolution of said wheel in said normal position, whereby said count includes only those of said articles not subject to said certain abnormalities.

10. The device defined in claim 7, further including:

inspection probe means coupled respectively to said pin moving means, for detecting said certain abnormalities at said corresponding preselected stations; and means coupled respectively to said detection means, for selectively controlling said corresponding subsequent processing steps on those of said articles with said certain abnormalities.

11. The device defined in claim 10, wherein said controlling means include article sorting means for separating those of said articles with said certain abnormalities from others of said articles.

12. The device defined in claim 11, wherein said controlling means further include means for selectively disabling said subsequent processing steps.

13. A memory device for controlling the processing of articles in an automated machine performing a sequence of processing steps on said articles at successive stations on said machine, comprising:

a plurality of memory elements, each having a normal memory condition and an active memory condition;

conveyer means for carrying said memory elements at spaced positions around a continuous path;

indexing means operatively associated with said machine, for advancing said conveyer means one position per processing step in unison with said machine, whereby each of said memory elements is associated with one of said articles being processed and is successively moved through a sequence of positions corresponding to said sequence of processing steps at said stations;

means for setting said memory elements in said active condition as said elements reach positions corresponding to preselected ones of said stations, said setting means being responsive to certain abnormalities in said articles detected at said corresponding preselected stations;

detection means responsive to those of said memory elements in said active condition, disposed at positions corresponding to processing steps subsequent to at least one of said preselected stations, and coupled to control corresponding subsequent processing steps;

means for resetting said memory elements to said normal memory condition as each of said elements completes its movement through said sequence of positions;

second detection means responsive to those of said memory elements in said normal condition and positioned with respect to said conveyor path immediately prior to said memory element resetting means; and counting means coupled to said second detection means, to accumulate a count of those of said memory elements completing said conveyer path in said normal condition, whereby said count includes only those of said articles not subject to said certain abnormalities.

14. The device defined in claim 13, further including:

inspection probe means coupled respectively to said memory element setting means for detecting said certain abnormalities at said corresponding preselected stations; and means coupled respectively to said detection means, for selectively controlling said corresponding subsequent processing steps on those of said articles with said certain abnormalities.

15. The device defined in claim 13, wherein said controlling means include article sorting means for separating those of said articles with said certain abnormalities from others of said articles.

16. The device defined in claim 15, wherein said controlling means further include means for selectively disabling said subsequent processing steps.

17. A memory device for controlling the processing of articles in an automated machine performing a sequence of processing steps on said articles at successive stations on said machine, comprising:
  a plurality of memory elements each having a normal memory condition and an active memory condition;
  means for associating each of said articles being processed with a corresponding one of said memory elements for the duration of said sequence of processing steps;
  means for setting said memory elements in said active condition in response to detection, at preselected ones of said stations, of certain abnormalities in corresponding articles;
  means for detecting those of said memory elements in said active condition, coupled to control subsequent processing steps on those of said articles having said certain abnormalities;
  means for resetting said memory elements to said normal condition as the corresponding articles complete said sequence of processing steps;
  inspection probe means coupled respectively to said memory element setting means, for detecting said certain abnormalities at said preselected stations; and
  means coupled respectively to said means for detecting memory elements in said active condition, for selectively controlling said subsequent processing steps on those of said articles having said certain abnormalities.

18. The device defined in claim 17, wherein said means for selectively controlling said subsequent processing steps include article sorting means for separating those of said articles with said certain abnormalities from others of said articles.

19. The device defined in claim 18, wherein said means for selectively controlling said subsequent processing steps further include means for selectively disabling said subsequent processing steps.

20. A memory device for controlling the processing of articles in an automated machine performing a sequence of processing steps on said articles at successive stations on said machine, comprising:
  a plurality of memory elements each having a normal memory condition and an active memory condition;
  means for associating each of said articles being processed with a corresponding one of said memory elements for the duration of said sequence of processing steps;
  means for setting said memory elements in said active condition in response to detection, at preselected ones of said stations, of certain abnormalities in corresponding articles;
  means for detecting those of said memory elements in said active condition, coupled to control subsequent processing steps on those of said articles having said certain abnormalities;
  means for resetting said memory elements to said normal condition as the corresponding articles complete said sequence of processing steps;
  means for detecting those of said memory elements in said normal condition; and
  counting means coupled to said normal condition detection means for accumulating a count of those of said articles not subject to said certain abnormalities.

21. A method for controlling the processing of articles in an automated processing machine performing a sequence of processing steps on said articles moved through successive stations on said machine, comprising the steps of:
  associating each of said articles being processed with a corresponding one of a plurality of memory elements;
  setting appropriate ones of said memory elements in an active memory condition in response to detection of certain abnormalities in said articles at preselected ones of said stations;
  detecting memory elements set in said active condition;
  controlling subsequent processing steps in a predetermined manner in response to elements in said active condition as detected by said step of detecting, said controlling step including disabling some of said subsequent processing steps to prevent unnecessary processing and damage to said articles having said certain abnormalities, and sorting those of said articles having said certain abnormalities from others of said articles leaving said processing machine; and
  counting those of said memory elements set in said active condition, whereby said step of counting accumulates a count of those of said articles not having said certain abnormalities.

* * * * *